United States Patent
Edwards et al.

[11] Patent Number: 6,109,681
[45] Date of Patent: Aug. 29, 2000

[54] TONNEAU COVER MOUNTING SYSTEM

[75] Inventors: Robert L. Edwards, Fountain Valley; Albert Hindelang, Chino, both of Calif.

[73] Assignee: Custom Fibreglass Manufacturing Co., Long Beach, Calif.

[21] Appl. No.: 09/158,349

[22] Filed: Sep. 21, 1998

[51] Int. Cl.[7] .................................................. B60P 7/02
[52] U.S. Cl. .............................. 296/100.02; 296/100.07; 296/100.06; 296/100.1
[58] Field of Search ........................ 296/100.02, 100.06, 296/100.07, 100.1, 100.08

[56] References Cited

U.S. PATENT DOCUMENTS

| | | | |
|---|---|---|---|
| 2,989,340 | 6/1961 | Penner | 296/100.1 |
| 3,012,814 | 12/1961 | Penner | 296/100.07 |
| 3,489,456 | 1/1970 | Klanke | 296/100.07 |
| 3,704,039 | 11/1972 | Dean | 296/100.07 |
| 3,785,698 | 1/1974 | Dean et al. | 296/100.1 |
| 3,923,334 | 12/1975 | Key | 296/100.07 |
| 4,079,989 | 3/1978 | Robertson | 296/100.07 |
| 4,083,596 | 4/1978 | Robertson | 296/100.1 |
| 4,101,162 | 7/1978 | Koehn | 296/100.1 |
| 4,124,247 | 11/1978 | Penner | 296/100.07 |
| 4,647,103 | 3/1987 | Walblay . | |
| 4,756,571 | 7/1988 | Lake | 296/100.01 |
| 4,762,360 | 8/1988 | Huber . | |
| 4,792,179 | 12/1988 | Stevens . | |
| 4,838,602 | 6/1989 | Nett . | |
| 5,102,185 | 4/1992 | Lake | 296/100.07 |
| 5,121,960 | 6/1992 | Wheatley . | |
| 5,152,274 | 10/1992 | Tucker . | |
| 5,275,458 | 1/1994 | Barben et al. . | |
| 5,310,238 | 5/1994 | Wheatley . | |
| 5,322,336 | 6/1994 | Isler | 296/100.1 |
| 5,503,450 | 4/1996 | Miller | 296/100.08 |
| 5,522,635 | 6/1996 | Downey . | |
| 5,540,475 | 7/1996 | Kersting et al. . | |
| 5,632,522 | 5/1997 | Gaitan et al. . | |
| 5,636,893 | 6/1997 | Wheatley et al. . | |
| 5,743,586 | 4/1998 | Nett | 296/100.02 |
| 5,857,729 | 1/1999 | Bogard | 296/100.07 |
| 5,909,921 | 6/1999 | Nesbeth | 296/100.06 |
| 5,957,525 | 9/1999 | Nelson | 296/100.06 |

OTHER PUBLICATIONS

Great Britain—Search Report Jun. 18, 1998.

*Primary Examiner*—Joseph D. Pape
*Assistant Examiner*—Kiran Patel
*Attorney, Agent, or Firm*—Fulwider Patton Lee & Utecht, LLP

[57] ABSTRACT

A system for mounting a hard tonneau cover to a pickup truck greatly simplifies the installation procedure. The system serves to automatically position the hinges, support struts and latching plates both relative to one another and relative to the truck. Moreover, this installation does not require any holes to be drilled through the truck's sheet metal while loads are distributed so as to prevent distortion of the top rails.

7 Claims, 3 Drawing Sheets

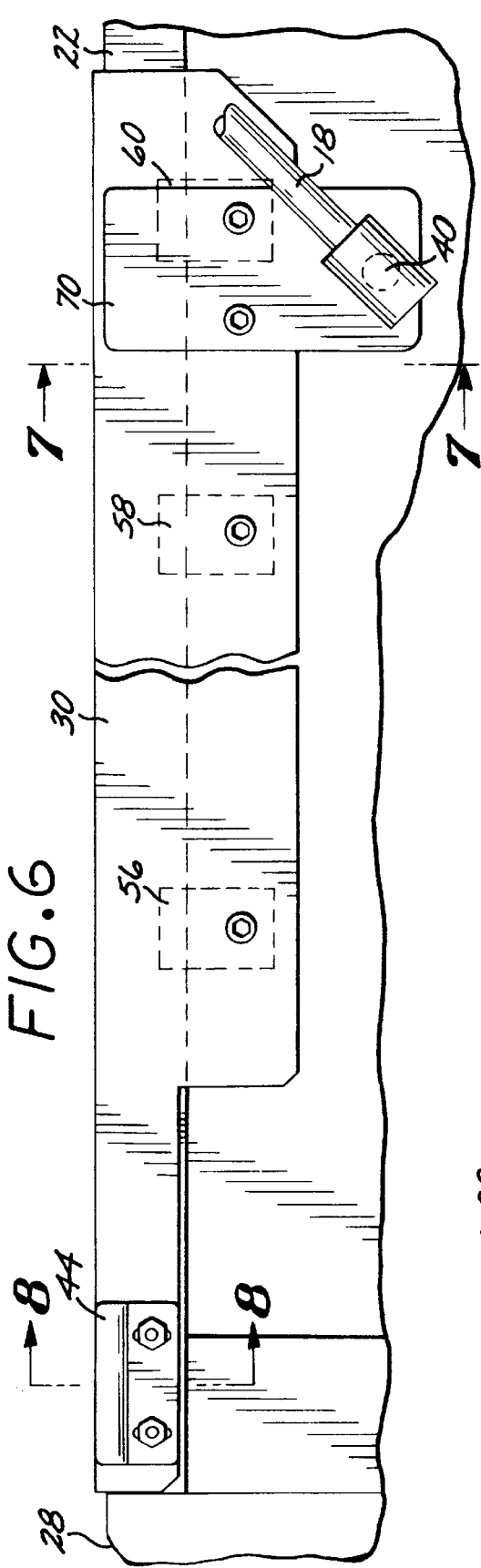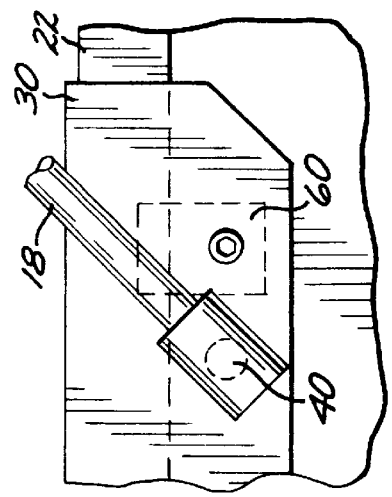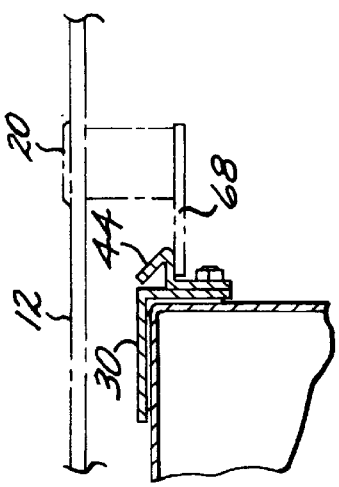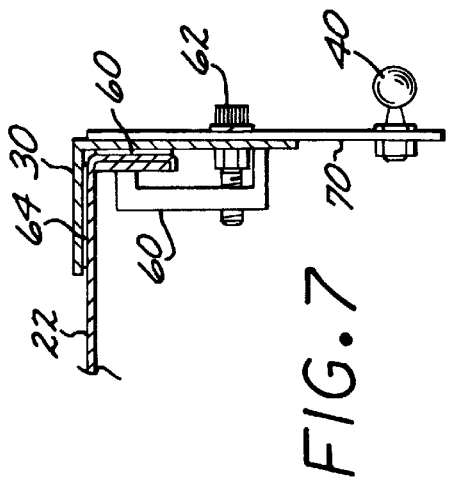

TONNEAU COVER MOUNTING SYSTEM

BACKGROUND OF THE INVENTION

The present invention generally relates to hard tonneau covers for pickup truck beds and more particularly pertains to the mechanism and hardware for mounting such devices to a truck.

As more and more pickup trucks are being purchased and used as primary transportation, items often end up being carried in the cargo bed that should more properly be secured from theft and protected from the elements. Tonneau covers, especially hard tonneau covers afford such protection and security and additionally enhance fuel mileage by smoothing out the air flow over the rear part of the vehicle. Additionally, many find an aesthetic appeal in covering up the cargo bed of a truck.

Hard tonneau covers are typically constructed of fiber reinforced resin, have a high quality finish to match the rest of the vehicle and form a weather tight seal about the top of the cargo bed's sidewalls. The covers are typically hinged at the front so as to tilt upwardly and are latched and lockable at the rear. Telescoping gas struts are used to hold the cover in its open position.

A disadvantage associated with many heretofore known covers is the need to drill holes in the truck's toprails in order to mount the cover thereto. Perforating the sheet metal is especially onerous because more than simple hand tools are thereby needed during installation, any miscalculation in positioning the holes is substantially irreversible and unless special steps are taken to protect the metal that is bared, rust will eventually develop. Another significant problem associated with drilling holes in the truck is the fact that many lease contracts specifically forbid such modifications and in view of the substantial costs that would be incurred in welding up each hole, refinishing and painting the bodywork, most lessees would effectively be forced to purchase the vehicle at lease end. In view of the present popularity of leasing, the desirability of fitting tonneau covers to pickup trucks poses a significant problem.

Hard cover systems are known that obviate the need to drill holes by employing clamps that engage the toprails to secure the hinges, the struts and the locking mechanism. However, such systems still suffer from the need to precisely position the various components along the toprails in order to allow the various components to properly cooperate with one another. Moreover, the wide tolerance variations found on many pickups further complicates the installation.

Finally, an additional problem encountered in the installation of heretofore known cover systems is inherent in the fact that many truck manufacturers use surprisingly thin sheet metal in the construction of their vehicles. Consequently, the substantial loads that may be imposed by the cover on the top rails, especially by the hinges and struts, may cause the top rails to distort to the point where the cover no longer lines up with the latching mechanism, or eventually to the point of structural failure.

A hard tonneau cover mounting system is therefore needed that is simple to install, that requires no holes to be drilled and that minimizes the loads imposed upon the truck's top rails.

SUMMARY OF THE INVENTION

The present invention provides a hard tonneau cover mounting system that is quickly and easily installed, requires no drilling of the truck's sheetmetal and minimizes the loads imposed upon the top rails during the opening and closing of the cover. These objectives are achieved with a combination of clamps and brackets that engage the top of the top rail. Installation is simplified with the use of brackets that automatically locate the strut attachment points with respect to the latch plates as well as relative to the truck and that automatically locate the position of the two hinge attachment points both relative to the truck bed and relative to one another. Moreover, the brackets are configured to distribute the loads exerted by the support struts over a substantial area of top rail. Similarly, most of the loads exerted by the hinges are transferred to top rails of the sidewalls rather than to the top rail of the front wall of the cargo bed.

A single bracket on each side of the cargo bed is used to support both the strut attachment point as well as the latch plate for the locking mechanism and thereby obviates the need to position these two elements separately. Such bracket is simply butted up against the tailgate and clamped to the top rail to set the two elements in position. The latch plate is of sufficient length to accommodate tolerance variations in the length of the bed and thereby allows the cover to lock thereto along a range of positions. A single bracket supports both hinges and extends across the entire length of the frontwall along its top rail to engage a section of top rail of each sidewall to which it is clamped. The hinges are thereby automatically positioned relative to one another and relative to the truck. The only tools that are needed for the cover's installation is a wrench to tighten the fasteners that draw the individual clamps against the underside of the top rails.

These and other features and advantages of the present invention will become apparent from the following detailed description of the preferred embodiments which, taken in conjunction with the accompanying drawings, illustrates by way of example the principles of the invention.

BRIEF DESCRIPTION OF THE DRAWINGS

FIG. 6 is a side plan view of the rear bracket as viewed along line 6—6 of FIG. 2;

FIG. 7 is a cross-sectional view of the rear bracket taken along lines 7—7 of FIG. 6;

FIG. 8 is a cross-sectional view of the rear bracket taken along lines 8—8 of FIG. 6; and FIG. 9 is a side plan view of a portion of an alternative embodiment rear bracket.

DETAILED DESCRIPTION OF THE PREFERRED EMBODIMENTS

Figure 1:
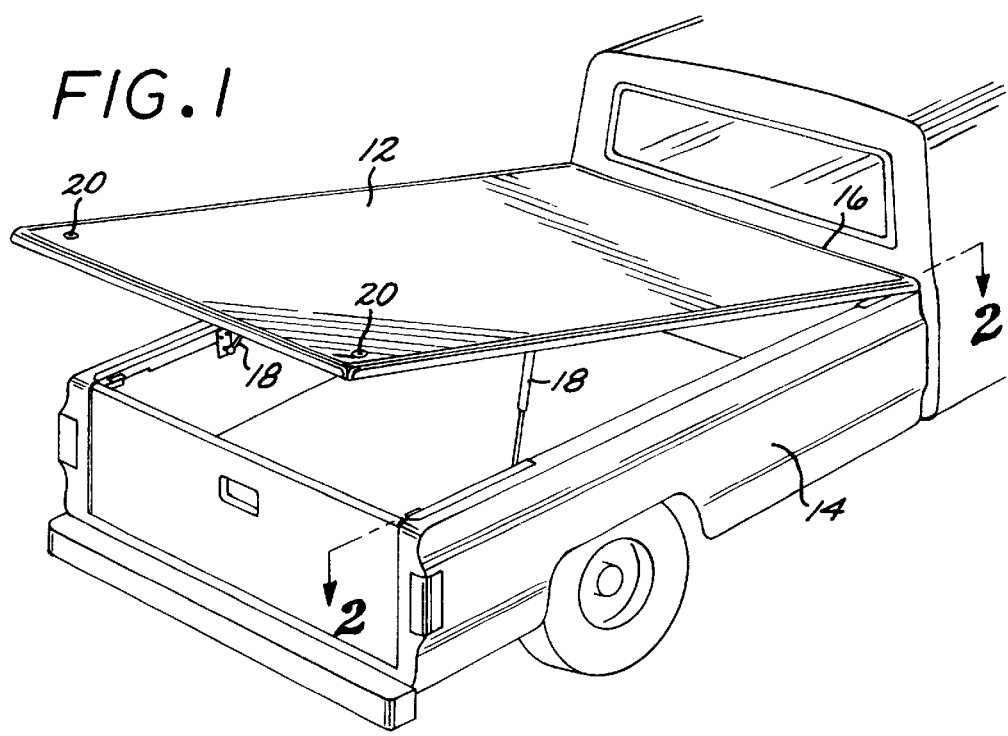
FIG. 1 is a perspective view showing the hard cover installed over the top of the truck's cargo bed using the mounting system of the present invention.

The Figures generally illustrate a preferred embodiment of the present invention. As is illustrated in FIG. 1, the mounting system serves to attach a hard tonneau cover 12 to the cargo bed 14 of a truck. The cover is hinged at the front 16 of the bed. Telescoping gas struts 18 support the cover while in its open position. Locks 20 on each side of the cover secure the cover in its closed position. The mounting system allows the cover to be quickly and easily installed without the need to drill any holes and serves to distribute the loads exerted by the cover over a substantial length of the top rails. An additional benefit is the ease with which the cover is removable from the truck to afford unrestricted access to the cargo bed.

Figure 2:
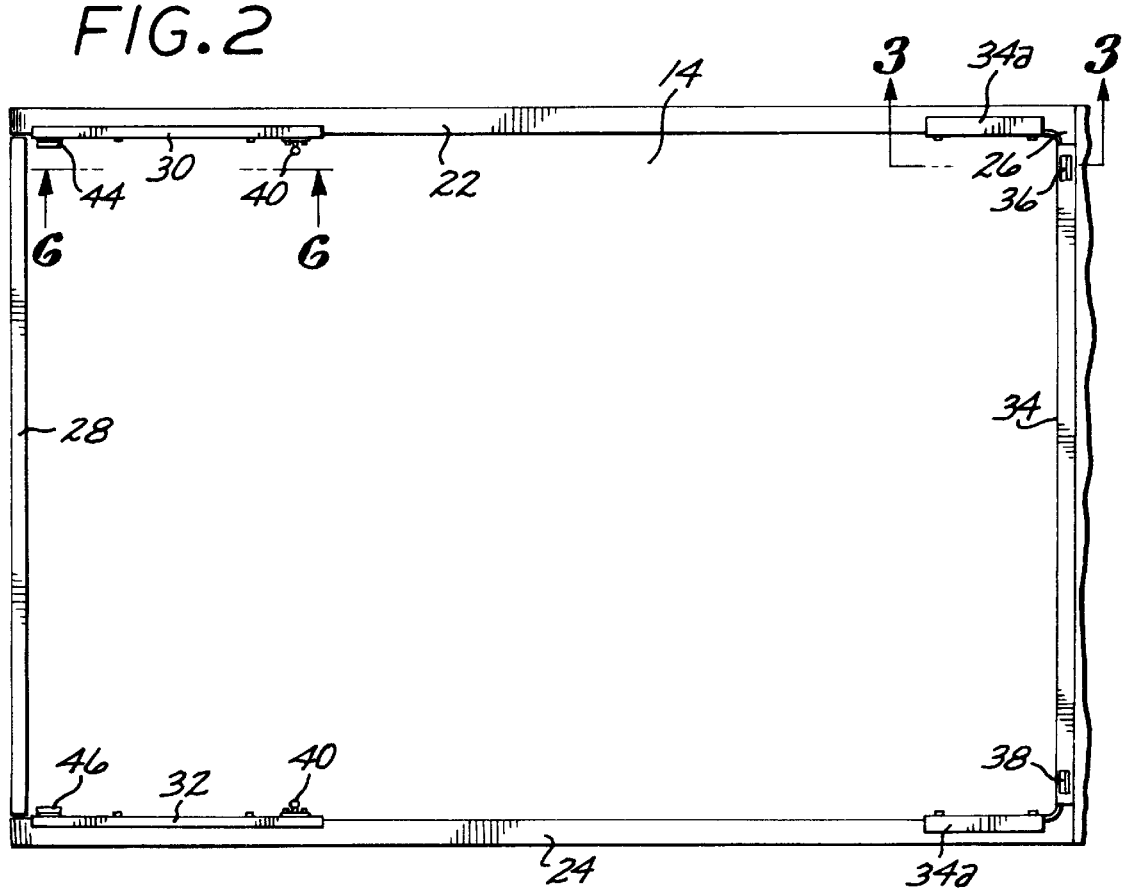
FIG. 2 is a top plan view of the components of the mounting system attached to the truck's top rails.

FIG. 2 is a top plan view illustrating the three brackets that attach the cover to the truck. The sides of the cargo bed 14 are topped by two side top rails 22, 24 and a front top rail 26. The tailgate 28 defines the rear of the cargo bed. Two rear brackets 30, 32 are attached to the rear of the side top rails while a single front bracket 34, 34a, 34b extends across the entire front top rail and along a portion of each side top rail. The front bracket includes two hinge supports 36, 38 while the rear brackets each include a strut anchor pin 40, and a latch plate 44, 46.

Figure 3:
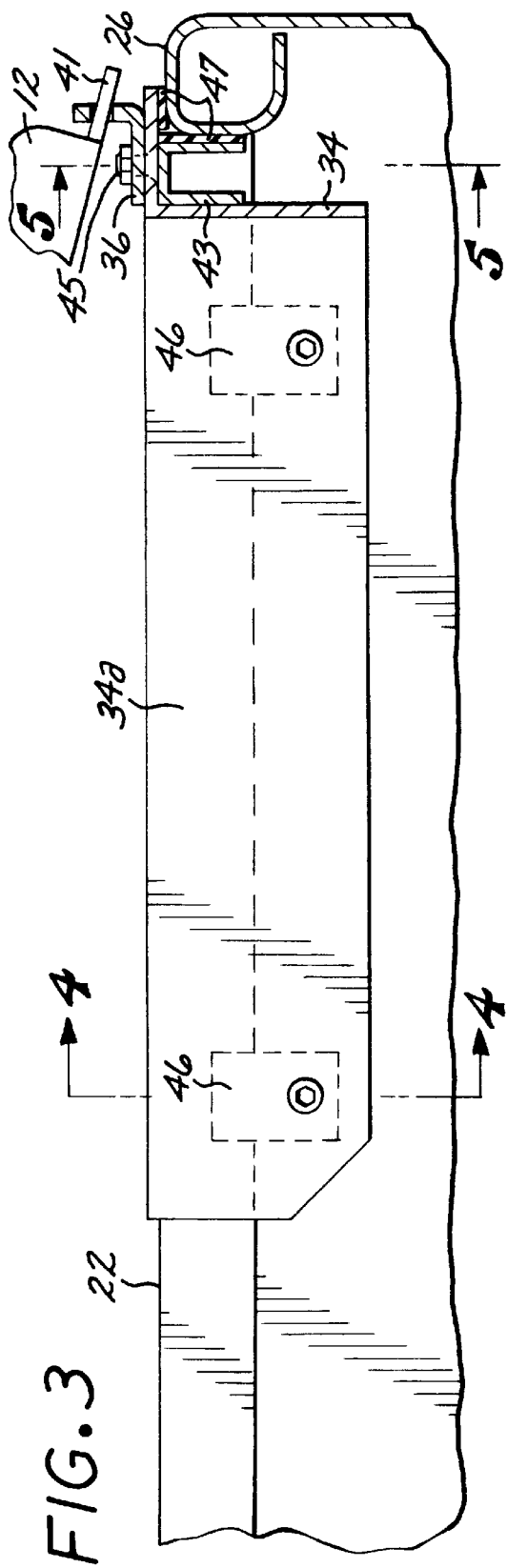
FIG. 3 is a cross-sectional view of the front bracket taken along lines 3—3 of FIG. 2.
Figure 5:
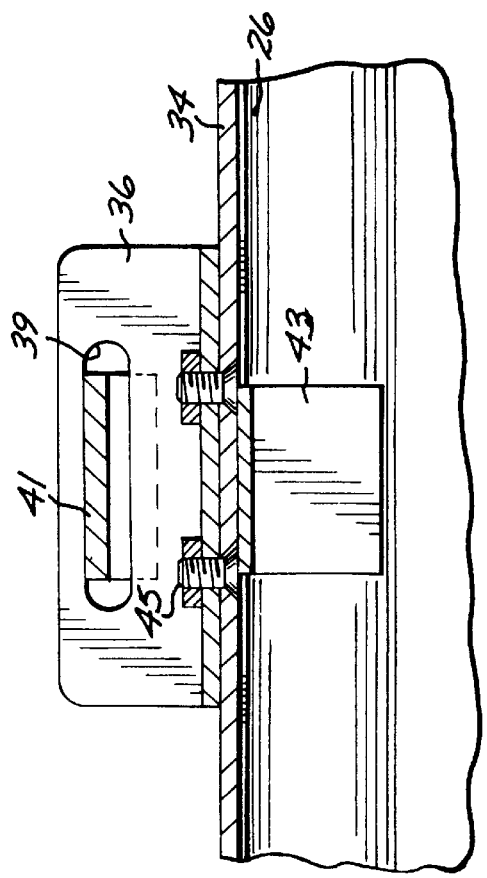
FIG. 5 is a cross-sectional view of the front bracket taken along lines 5—5 of FIG. 3.

FIG. 3 provides more detail relating to the structure of the front bracket. The bracket consists of an up-ended L-channel wherein sections of the top member have been removed at what coincides with the front corners of the pickup truck bed to enable the L-channel to be bent to 90°. Short sections of another L-channel are attached to front bracket 34 to serve as hinge supports 36. As is visible in FIG. 5, the hinge supports have slots 39 formed therein to accommodate the tabs 41 that extend from the cover 12. Such mechanism allows the cover to pivot and additionally allows the cover to be easily removed. The section of bracket 34 directly under each hinge support 36 is spaced from the front wall of the truck bed by a short section of U-channel 43 wherein the three components 34, 36, 43 may be joined by welding or by fasteners 45 or both. Rubber gaskets 47 are adhered to the underside of the bracket 34 and the reinforcing channel 43 to bear on the top rail 26 of the truck bed.

Figure 4:
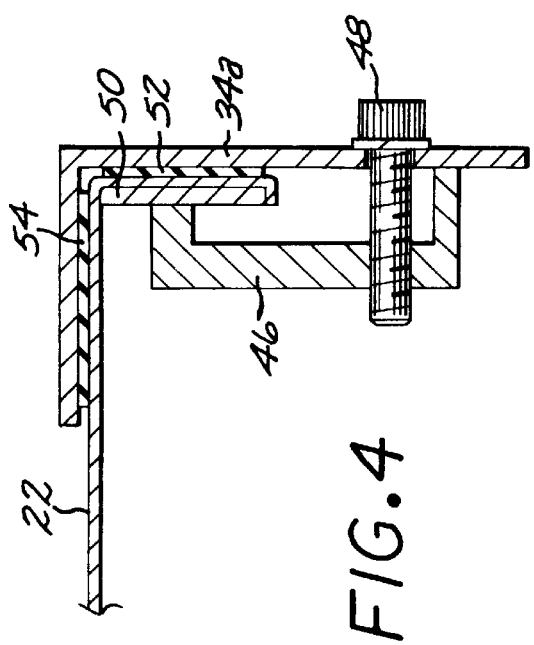
FIG. 4 is a cross-sectional view of the front bracket taken along lines 4—4 of FIG. 3.

The front bracket 34 is actually attached to the truck by clamps 46, 48 that securely fasten the rear facing sections 34a, 34b, to the top rail 22. As is visible in FIG. 4, a U-shaped clamp 46 is threaded to receive a bolt 48. By tightening the bolt, the clamp is forced against the underside of the top rail 22. A reinforcing plate 50 is used by many truck manufacturers to reinforce such component. Rubber gaskets 52, 54 are sandwiched between the bracket 34a and the top rail 22.

FIGS. 6–8 provide detail relating to the rear brackets 30, 32 wherein the two brackets are mirror images of each other. FIG. 6 is a side plan view of left rear bracket 30. The bracket consists of a section of L-channel as is clearly visible in FIGS. 7 and 8. Three clamps 56, 58, 60 are used to secure the bracket to the top rail 22 in precisely the same configuration as was described above for the front bracket 34. The U-shaped clamp 60 is forced against the inside surface of the end rail by threaded fastener 62. Rubber gaskets 64, 66 are sandwiched between the top rail and the bracket.

A latch plate 44 is attached at the rear of the rear bracket 30. The section of Z-channel is simply bolted to the bracket 30 and cooperates with lock cam 68 to secure the cover 12 in its closed position. A key inserted into lock 20 allows the lock pin to be rotated so as to either engage or disengage the latch. The latch plate is long enough to accommodate any length variation in the cargo bed as well as thermal expansion and contraction as well as other distortions the bed may undergo during normal use.

A pivot pin 40, preferably the ball of a ball and socket arrangement is rigidly affixed either directly to the rear bracket 30 as is shown in FIG. 9 or to bracket extension 70 as is shown in FIGS. 6 and 7. The extension may be necessary on some trucks in order to accommodate a properly sized strut 18. The extension also serves to make opening of the cover easier and its closing harder. A socket formed in the strut releasably receives the ball 40 and allows the strut to freely pivot. Slight spring pressure must be overcome in order to remove or reattach the strut's socket to the ball 40.

In order to install the cover 12 on a pickup truck's cargo bed, the front bracket 34 is attached first. Because both hinges 36 are attached to the bracket and the bracket 34a, 34b extends to the side top rails, there is no need to make any measurements. The bracket is simply set on top of the top rails, moved as far forward as possible and the clamps 46, 48 tightened. In the event the tolerance stack-up of a particular vehicle causes excessive gaps to appear, between the bracket 34a, 34b and top rail 22, 24 shims or spacers may be placed between the top rail and bracket to prevent distortion of the top rail when the clamps are tightened. After the front bracket has been secured, the rear brackets 30, 32 are positioned on the aft part of the top rails 22, 24 so as to abut the tail gate 28 after which the clamps 56, 58, 60 are tightened. The cover is then positioned over the bed such that tabs 41 are extended through slots 39 of hinge supports 36, 38. Upon pivoting the cover upwardly, the struts 18 are snapped over the pins 40, to complete the installation.

The configuration allows the cover to be quickly and easily removed in the event bulky cargo is to be carried by simply unlocking and opening the cover, forcing the struts 18 off the pins 40 and extracting the tabs 41 from the slots 38 formed in the hinge supports 36, 38. In the event the entire cover and mounting system must be removed, each of the clamps 40, 48, 56, 58, 60, is simply loosened to allow the brackets to be removed whereby the top rails remain in tact and unblemished.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A system for mounting a hard tonneau cover over a pickup truck bed wherein such bed is bordered by a front top rail, two side top rails and a tailgate, comprising:

a front bracket extending along said entire front top rail and fastened to said two side top rails, said front bracket having two hinge elements attached thereto that are positioned and configured to cooperate with hinge elements extending from said hard cover; and two rear brackets, each extending along a section of side top rail and fastened thereto, each such rear bracket having a mounting element for a telescoping support strut extending from said cover and a lock pin receiving element for cooperating with a locking mechanism affixed to said hard cover.

2. The system of claim 1, wherein said front bracket and said two rear brackets clamp to said side top rails.

3. The system of claim 2, wherein said clamps engage underneath said side top rails.

4. The system of claim 1, wherein said lock pin receiving element is configured to allow a lock pin to engage at various positions along its length whereby tolerance variation in bed length are accommodated.

5. The system of claim 1, wherein said hinge elements extending from the cover are elongated tabs and said hinges elements attached to said brackets have slots formed for receiving said tabs whereby the hinge elements are joined by sliding the cover forwardly and disengaged by sliding the cover rearwardly.

6. A method of installing a hard tonneau cover on a pickup truck bed wherein such bed is bordered by a front top rail, two side top rails and a tailgate, comprising the steps of:

providing a front bracket of sufficient length to extend between said side top rails, having hinge elements attached thereto and configured to clamp to such side top rails;

providing two rear brackets, each configured to clamp to a side top rail and having a mounting element for a telescoping support strut as well as a lock pin receiving element configured to cooperate with a locking mechanism at positions along a length of said top rail;

placing said front bracket on top of said side top rails and sliding it forwardly into position against said front top rail;

clamping said front bracket to said side top rails in such forward position;

placing said rear bracket on top of said side top rails and sliding them rearwardly into position abutting said tailgate; and clamping said rear brackets to said side top rails in such rearward position.

7. The method of claim 6, further comprising the steps of:

positioning said cover so as to engage said hinge elements; and attaching telescoping support struts to said cover and to said rear brackets.

* * * * *